(12) United States Patent
Wasserman et al.

(10) Patent No.: US 7,266,255 B1
(45) Date of Patent: Sep. 4, 2007

(54) DISTRIBUTED MULTI-SAMPLE CONVOLUTION

(75) Inventors: Michael A. Wasserman, Redwood City, CA (US); Paul R. Ramsey, Tucson, AZ (US); Nathaniel David Naegle, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 302 days.

(21) Appl. No.: 10/673,087

(22) Filed: Sep. 26, 2003

(51) Int. Cl.
| | |
|---|---|
| *G06K 9/54* | (2006.01) |
| *G06K 9/60* | (2006.01) |
| *G06K 9/40* | (2006.01) |
| *G06K 9/36* | (2006.01) |
| *G09G 5/00* | (2006.01) |
| *G06F 15/00* | (2006.01) |
| *G06F 15/76* | (2006.01) |

(52) U.S. Cl. ............... 382/307; 382/260; 382/261; 382/276; 345/643; 345/644; 345/619; 712/16

(58) Field of Classification Search ............ 345/619, 345/632, 642–645; 708/406–407, 509, 522; 712/10, 12, 14–16, 19, 25, 33; 382/260–263, 382/307
See application file for complete search history.

(56) References Cited

U.S. PATENT DOCUMENTS

| | | | | |
|---|---|---|---|---|
| 4,885,715 A | * | 12/1989 | McCanny et al. | 708/420 |
| 4,984,286 A | * | 1/1991 | Dolazza | 382/263 |
| 4,998,288 A | * | 3/1991 | Bui et al. | 382/279 |
| 5,129,092 A | * | 7/1992 | Wilson | 712/16 |
| 5,170,463 A | * | 12/1992 | Fujimoto et al. | 706/41 |
| 5,742,349 A | * | 4/1998 | Choi et al. | 348/443 |
| 5,825,929 A | * | 10/1998 | Chen et al. | 382/236 |
| 5,892,962 A | * | 4/1999 | Cloutier | 712/16 |
| 6,147,695 A | * | 11/2000 | Bowen et al. | 345/503 |
| 6,154,223 A | * | 11/2000 | Baldwin | 345/506 |
| 6,266,443 B1 | * | 7/2001 | Vetro et al. | 382/199 |
| 6,424,343 B1 | | 7/2002 | Deering et al. | |
| 6,496,187 B1 | | 12/2002 | Deering et al. | |
| 6,504,959 B1 | * | 1/2003 | Lee | 382/260 |
| 6,553,397 B2 | * | 4/2003 | Willson et al. | 708/319 |
| 6,614,448 B1 | * | 9/2003 | Garlick et al. | 345/605 |
| 6,819,321 B1 | * | 11/2004 | Hsieh et al. | 345/506 |
| 6,819,337 B2 | | 11/2004 | Naegle | |
| 2002/0033828 A1 | | 3/2002 | Deering et al. | |

(Continued)

OTHER PUBLICATIONS

U.S. Appl. No. 10/989,599, filed Nov. 16, 2004, Wasserman et al.

(Continued)

*Primary Examiner*—Ulka J. Chauhan
*Assistant Examiner*—Eric Woods
(74) *Attorney, Agent, or Firm*—Meyertons Hood Kivlin Kowert & Goetzel, P.C.; Jeffrey C. Hood

(57) ABSTRACT

A multi-chip system is disclosed for distributing the convolution process. Rather than having multiple convolution chips working in parallel with each chip working on a different portion of the screen, a new design utilizes chips working in series. Each chip is responsible for a different interleaved region of screen space. Each chip performs part of the convolution process for a pixel and sends a partial result on to the next chip. The final chip completes the convolution and stores the filtered pixel. An alternate design interconnects chips in groups. The chips within a group operate in series, whereas the groups may operate in parallel.

26 Claims, 12 Drawing Sheets

U.S. PATENT DOCUMENTS

| | | | |
|---|---|---|---|
| 2002/0070944 A1* | 6/2002 | Deering | 345/581 |
| 2002/0101428 A1* | 8/2002 | Hsiao et al. | 345/539 |
| 2003/0025701 A1* | 2/2003 | Kehlet et al. | 345/537 |
| 2003/0169274 A1* | 9/2003 | Oberoi et al. | 345/589 |
| 2004/0004620 A1* | 1/2004 | Inada et al. | 345/501 |
| 2004/0170223 A1* | 9/2004 | Chiueh et al. | 375/229 |

OTHER PUBLICATIONS

U.S. Appl. No. 09/894,617, filed Jun. 27, 2001, Deering et al.

* cited by examiner

FIG. 7

Interleave Map

Pixel (sample bin) Assignments to the Group A
Sample Managers numbered 0, 1, 2 and 3

Group Numbers
(A=0, B=1, C=2, D=3)

*FIG. 8*

DISTRIBUTED MULTI-SAMPLE CONVOLUTION

BACKGROUND OF THE INVENTION

1. Field of the Invention

This invention relates generally to the field of computer graphics and, more particularly, to a high performance graphics system.

2. Description of the Related Art

There exist high performance graphics systems that perform super-sampling. For every pixel seen on the screen, more than one sample is generated and stored in memory. Prior to display on screen, a set of samples is convolved (or filtered) to produce a single color for a corresponding pixel. Filtering may be performed using a variety of methods, but typically involves generating a weighted average of a set of samples that are within a defined region of sample space called a kernel that is centered on a pixel location. In high performance graphics systems this set of samples may be distributed among a plurality of memory chips. To generate a single pixel, a convolution chip may need to retrieve samples from a plurality (or possibly all) of the memory chips. A large cross-bar routing network is utilized to achieve the sample data routing. This routing network utilizes significant board area, is difficult to layout, and scales geometrically when additional resources are added.

SUMMARY

A novel solution to the design issues inherent in filtering samples may be achieved by distributing the convolution process. Rather than having multiple convolution chips working in parallel with each chip working on a different portion of the screen, a new design utilizes convolution chips working in series. Each convolution chip in a chain of chips performs part of the filtering process and sends a partial result on to the next chip. The final chip in the chain completes the convolution and stores the filtered pixel. Distributing the convolution process in this manner may enable a much simpler board design. Instead of a cross-bar providing communication between all of the memory chips and all of the convolution chips, this new design enables a dedicated, direct connection between a set of memory chips and a corresponding convolution chip.

Each convolution chip (also referred to herein as a sample manager) determines if any of the samples in its dedicated memory fall within a convolution kernel corresponding to a pixel. The sample manager calculates a weight for each sample, a sum of weighted samples, and a sum of weights for any samples that are within the convolution kernel. A sum of weighted samples is determined for each parameter value included in each samples data. The sums are referred to as partial results or partial sums. Since the partial sums are additive, the sample manager adds the partial sums it has generated to any prior accumulated partial sums it received from the prior sample manager in the chain and sends the new accumulated partial sums to the next sample manager in the chain. After the final sample manager in the chain adds the partial sums it has generated to the accumulated partial sums it received, the final sum of weighted samples (for each parameter value) is divided by the sum of the weights to determine normalized values for the pixel parameters.

The weight for a sample is generated as a function of the distance from the location of the sample to the pixel location (the center of the convolution kernel). The weight function is user definable and is typically generated from a lookup table stored in a cache or memory.

The samples to be considered are all the samples that are within a convolution kernel corresponding to a pixel. The convolution kernel is bounded by an array of pixel regions (sample bins) in sample space (typically a 5 by 5 array of sample bins). Those samples that lie outside the convolution kernel (also referred to as the filter boundary), but within the bounding array of sample bins may be assigned a weight of zero or may be excluded from the filtration calculations.

Each sample manager may contribute to most pixel calculations if the portions of sample space assigned to each sample manager are finely interleaved. However, if the sample space is coarsely interleaved, some sample managers may be idle and waste bandwidth passing partial results without adding additional weighted samples to the partial results. For example, a particular sample manager (or group of sample managers) may be responsible for a particular section of the screen (that is large with respect to the convolution kernel). When processing pixels within the particular section, other sample managers (or groups of sample managers) may be idle.

A solution to these processing issues may be provided by an alternate architecture for the interconnection of sample managers in a series/parallel structure. In these embodiments, the set of sample managers is divided into groups. Within a group, the sample managers operate in series, whereas the groups may operate in parallel. Sample space is partitioned by a repeating pattern of an array of sections of sample space. The samples within each section are stored in the memories attached to one group of sample managers, and each section is large compared to the convolution kernel. The majority of pixels located in the interior of a section may be processed by the corresponding group of sample managers. Pixels that lie near the edge of a section may be processed by two or more groups of sample managers. This may result in a reduction in the amount of hardware and interconnect bandwidth utilized to implement distributed convolution.

BRIEF DESCRIPTION OF THE DRAWINGS

A better understanding of the present invention can be obtained when the following detailed description is considered in conjunction with the following drawings, in which:

FIG. 7 illustrates a 5 by 5 filter kernel superimposed over an 8 by 8 array of sample bins and the interleaved Sample Manager assignments;

FIG. 8 shows a set of sample bins and an assigned Sample Manager for each bin for an interleaved system with four groups of four Sample Managers;

Figure 1:
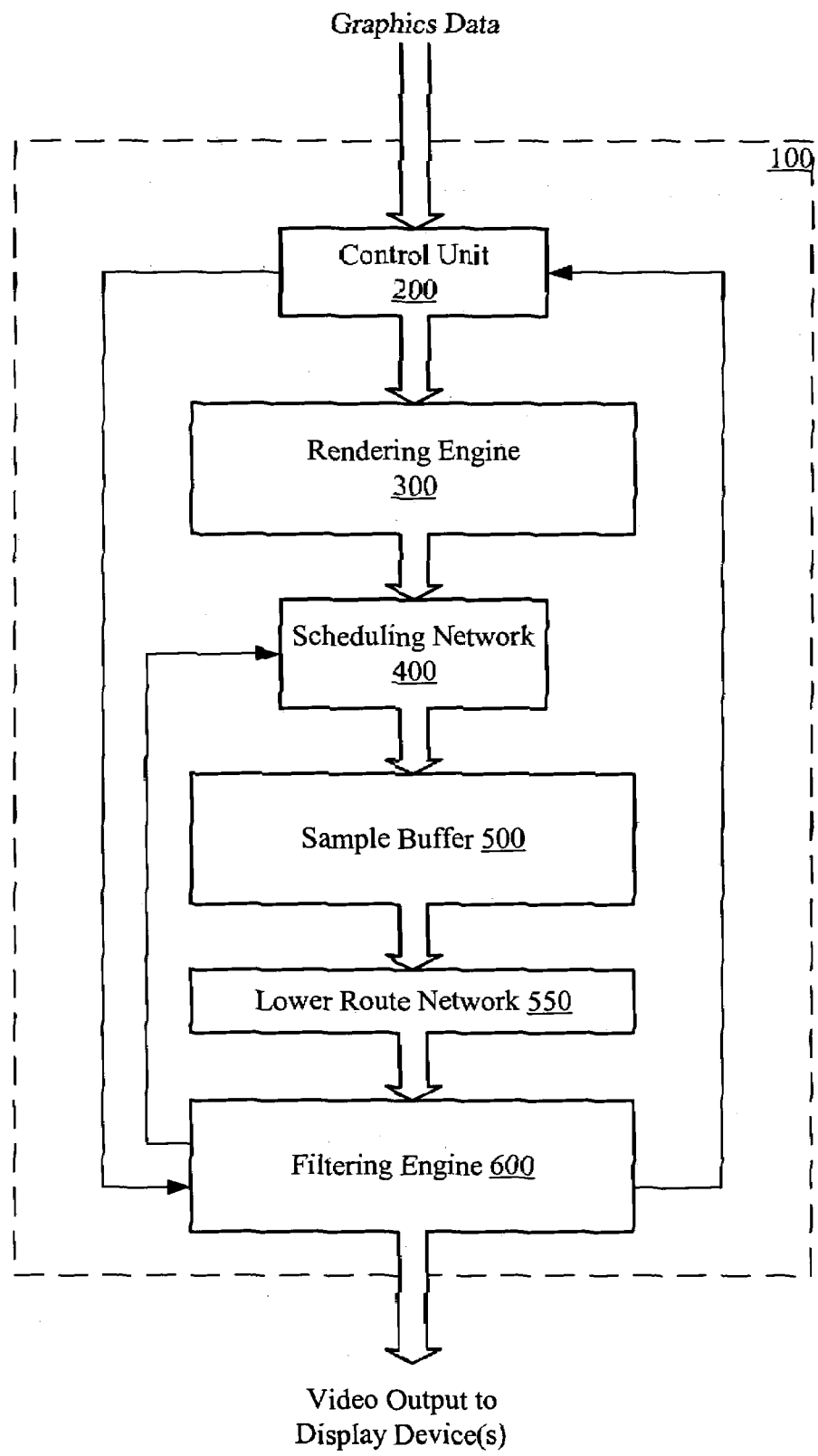
FIG. 1 provides a block diagram of one set of embodiments of a graphics accelerator configured to perform graphical computations.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

A sample filtering system is described that may reduce board routing by eliminating crossbars, reduce the number of ASICs to be developed, and increase the fill rate by building a wider interface to sample buffer memory (interleaved over multiple chips).

Sample Manager ASIC

Figure 2:
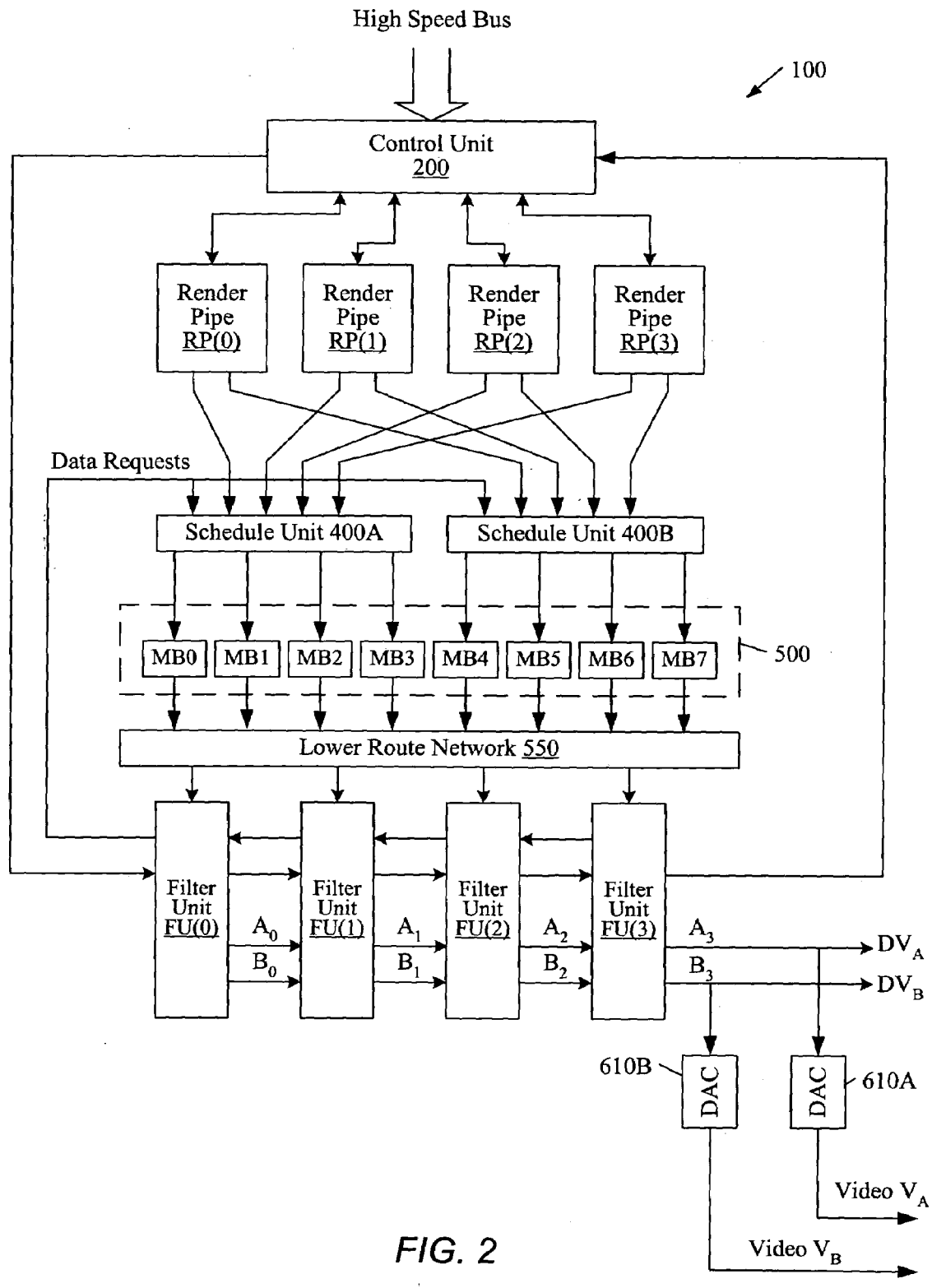
FIG. 2 provides additional details for one set of embodiments of a graphics accelerator configured to perform graphical computations.

A graphics accelerator system may be configured according to a multiple crossbar architecture as suggested by FIGS. 1 and 2. The crossbar architecture includes three sets of ASICs: a scheduling network 400 (i.e., a set of Sched ASICs), a lower route network 550, and a filtering engine 600 (i.e., a set of Convolve ASICs also referred to as filter units FU(K)).

Please refer to U.S. patent application Ser. No. 09/251,453, filed on Feb. 17, 1999, entitled "A Graphics System with Programmable Real-Time Sample Filtering", invented by Deering, Naegle and Nelson, for more information on various embodiments of a graphics accelerator system utilizing a crossbar architecture. This patent application is hereby incorporated by reference in its entirety.

Figure 3:
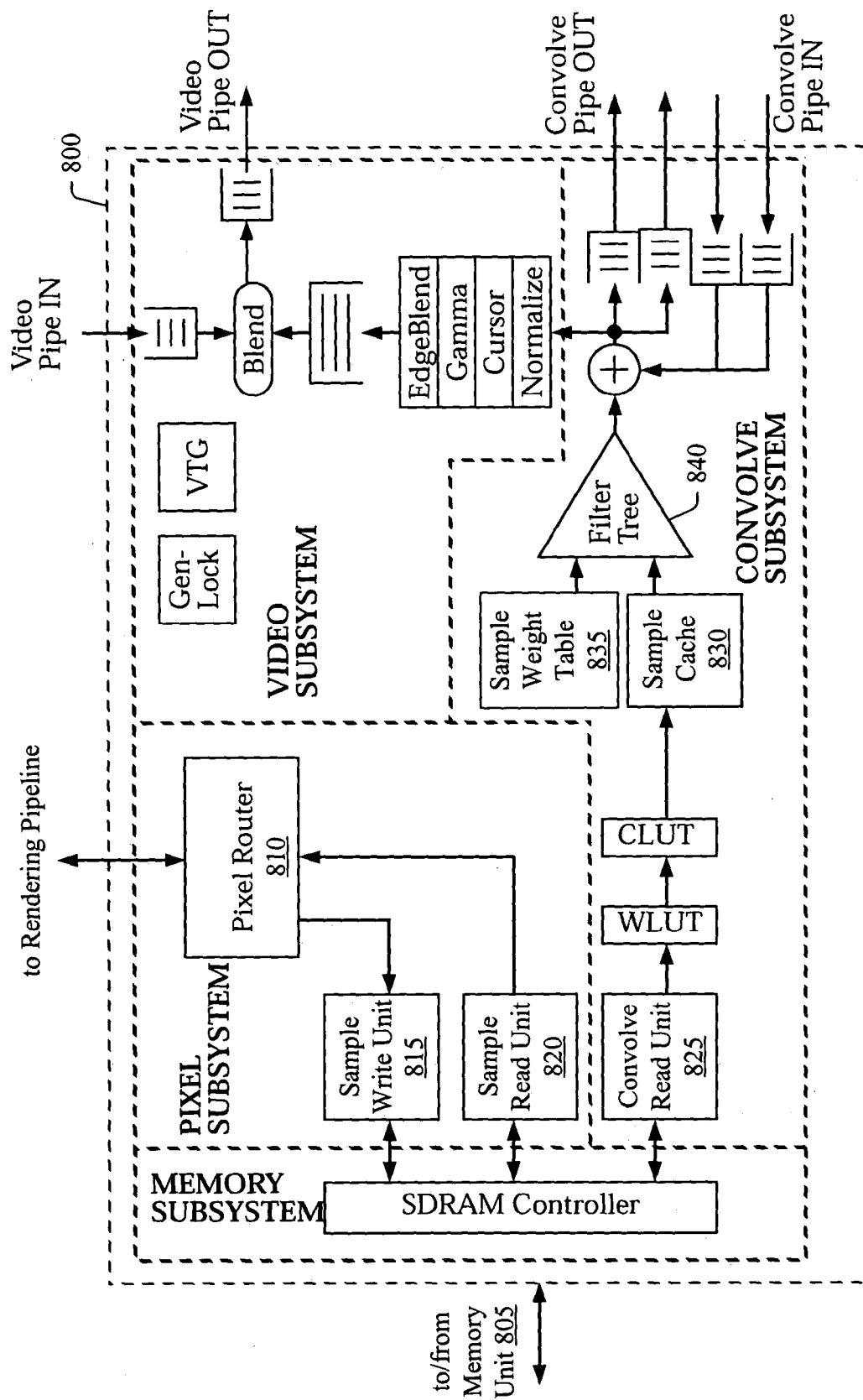
FIG. 3 provides a block diagram of one set of embodiments of a Sample Manager ASIC capable of distributed convolution of sample values to pixel values.
Figure 4:
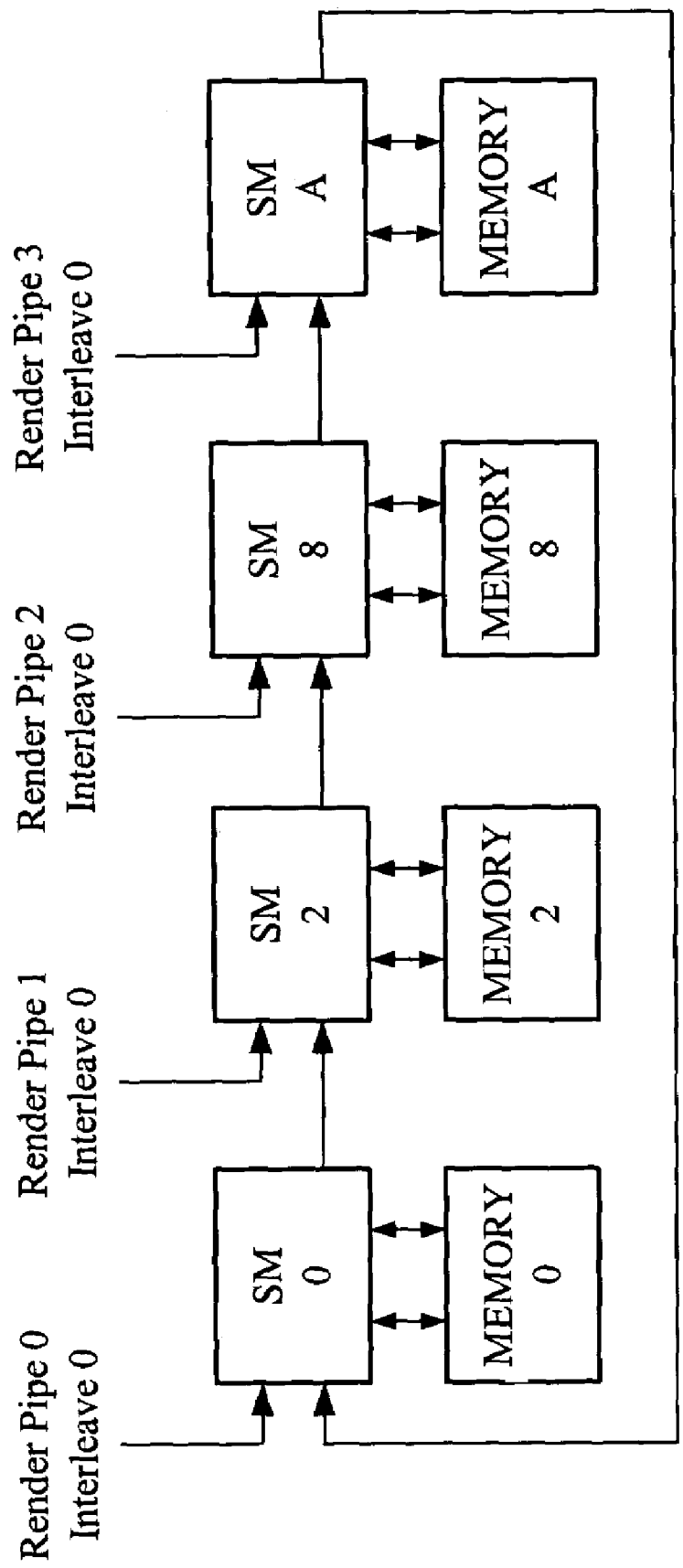
FIG. 4 provides a block diagram of one set of embodiments of a set of Sample Manager ASICs and a ring bus for sample/pixel data for one interleave.
Figure 6:
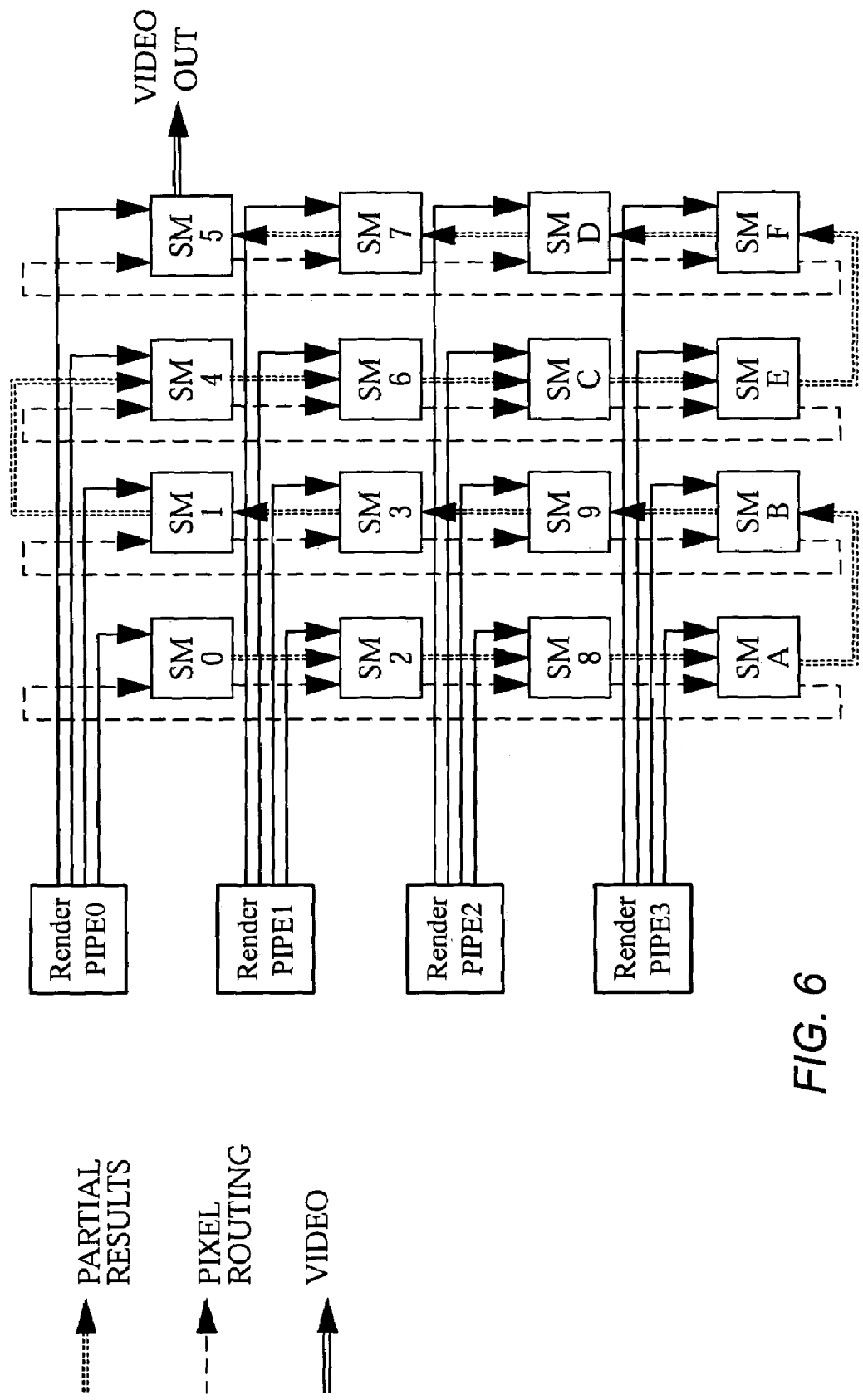
FIG. 6 illustrates a first interconnection topology for a system of 16 Sample Manager ASICs.

In an alternative architecture, the three sets of ASICs may be replaced with one set of ASICs referred to herein as sample managers 800. The sample managers 800 provide the functionality of the three sets of ASICs. Each sample manager (also referred to herein as SM) includes four subsystems: Memory, Pixel, Convolve, and Video. These subsystems are delineated for some embodiments, in the block diagram shown in FIG. 3. The sample managers may utilize a ring routing approach (as shown in FIGS. 4 and 6), which may also reduce the complexity of board layout.

The crossbar architecture, (shown in FIGS. 1 and 2) may use Sched ASICs 400 and Lower Route ASICs 550 to serve as crossbar switches around the sample buffer 500. Sched ASICs 400 give each of the rendering pipes 300 access to the entire sample buffer 500. Lower Route ASICs 550 give each of the Convolve ASICs 600 access to the entire sample buffer 500. Each rendering pipe RP may rasterize triangles into 2×2 pixel tiles (also referred to as a 2 by 2 array of sample bins). Within each of these pixels, up to 16 sub-pixel samples may be generated. Each RP generates four sample outputs each cycle—one per interleave. Based on an interleave number, the sample is routed to the appropriate Sched ASIC 400, which routes the sample to one of a plurality of memory chips in the sample buffer 500. Note that the interleaving of a sample address may not be directly related with the interleave of the pixel address (which contains those samples). This results in the samples for a particular pixel (often called a bin or sample bin) being spread out among the various memory chips.

On the convolve side (i.e., the filtering side) of the sample buffer 500, Lower Route network 550 provides a path between each group of memory chips and each of the Convolve ASICs 600. Each of the Convolve ASICs 600 may be responsible for generating video pixels for a portion of the screen and to do so will request the samples required to generate those pixels. Due to the interleaving of samples, those samples may be spread across the entire sample buffer 500. In some embodiments, the sample buffer 500 may include 64 memory chips. Each memory bank (such as MB0) may include 8 memory chips.

Figure 5:
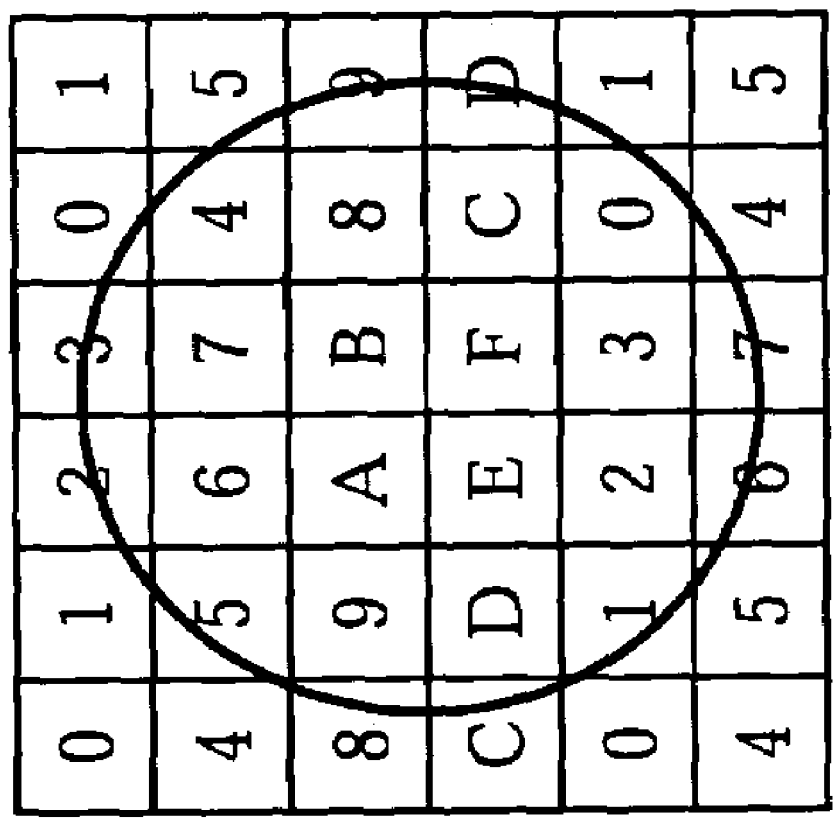
FIG. 5 shows a set of sample bins and an assigned Sample Manager for each bin for an interleaved system with 16 Sample Managers.

The new topology replaces the Sched, Convolve, and LowerRoute ASICs with a set of sample manager ASICs 800, each directly connected to a memory. The sample buffer 500 is to be interpreted as the union of the attached memories. For a system with four rendering pipelines, sixteen SMs 800 may be used, each with its own memory. The 16 SMs 800 may be interleaved according to a 4×4 grid in pixel (screen) space as shown in FIG. 5. The 4×4 grid may be further divided into four groups of four based on the low-order bits of the screen address. These groups are directly correlated to the 2×2 interleaves of the rendering pipeline output. Each rendering pipeline output interleave may be mapped directly to a group of four SM ASICs 800.

Within each group, the four SMs are connected in a ring. Each chip receives an input from one of the four rendering pipes (RP). In addition, it receives sample data from the previous chip in the ring, and sends sample data to the next chip in the ring. FIG. 4 shows the interconnection of the four sample manager ASICs 800 dedicated to Interleave 0. This structure may be replicated for the three remaining interleaves. Each RP may access any portion of the sample buffer 500, and the memory may be interleaved in a 2×2 pattern. This structure may achieve a decrease in board complexity at the expense of some latency. The samples for a particular pixel are not spread out among the various memories of the sample buffer 500. Rather, the memory chips are interleaved in screen-space. The samples within a particular pixel are stored in the same memory chip (also referred to as simply RAM). This permits deferring multi-sample expansion until after the RP-SM interface. This may allow an increased fill rate in cases where the SM-memory interface is faster than the RP-SM interface. A custom RAM may offer significant benefits for fill-rate since the internal interfaces may be faster.

A major difference from the crossbar architecture appears when convolution of samples into video pixels is considered. In the crossbar architecture, samples "belong" to the sample buffer, and LowerRoute allows each Convolve ASICs equal access to the entire sample buffer. In the new topology, each SampleManager ASIC 800 "owns" a portion of the sample buffer 500. Since the SMs may be finely interleaved, each of the SMs may contribute to a filtered pixel. FIG. 5 shows a circular filter support of radius 2.5 superimposed on a map of a 16 SM system. Each of the SMs contributes samples from one or more bins to the final filtered sum.

The SM ASICs 800 may also be chained together via a "partial results" bus as shown in FIG. 6. Each SM weights the samples within its own memory. These weighted samples are summed, along with the sum of the sample weights. These "partial results" are added to the partial results from the previous SM and the sum is passed onto the next SM in the chain. The final SM normalizes the sums and outputs the filtered video pixel. A video bus may be used to provide board-to-board connectivity as suggested in FIG. 6 by the pathway labeled "video out".

Sample Manager Subsystems

The sample manager 800 may include four subsystems: Memory, Pixel, Convolve, and Video. These subsystems are delineated (for some embodiments) in the block diagram shown in FIG. 3.

Memory Subsystem

In some embodiments, standard SDRAM (synchronous dynamic RAM) memory technology may be used. In other embodiments, a next-generation 3D-RAM memory may allow some processing features to be embedded into the RAM, which may result in higher performance.

Pixel Subsystem

The pixel subsystem is responsible for writing (or reading) sample data to (or from) a dedicated local memory unit 805. In some embodiments, the Pixel Router 810 selects samples that are located in a portion of sample space assigned to the sample manager and stores the selected samples in the dedicated local memory unit 805. The Pixel Router 810 transfers samples that are not located in the portion of sample space assigned to the sample manager to another SM 800 via a ring bus that connects a plurality of SMs in a ring. Since the SMs may be assigned screen space regions that are interleaved in a regular pattern, it suffices in these cases to decode the lower bits of any sample address (X,Y) to determine which SM is the destination of that pixel. Samples that lie outside of the SM's assigned screen space region are passed on the ring output. Samples that lie inside of the SM's assigned screen space region are stored in the SM's memory.

The Pixel Router 810 is also responsible for maintaining order when in ordered mode. Depending on the topology chosen, ordered mode is maintained in different ways. In standard topology ordering is maintained through the use of tokens and FIFOS. Pixels are first sorted by their source (which RP the pixel was generated from) and placed in an appropriate FIFO. In unordered mode, data is taken out of the FIFOs in a round-robin fashion. Thus, data from all sources may be evenly handled. In ordered mode, data is taken from only one FIFO at a time, thus taking data from one rasterizer in order. When switching to the next rasterizer, a token may be sent down each of the pipes, indicating the next rasterizer to generate pixels. When the tokens reach the bottom of the FIFOs, the Pixel Router may switch to the appropriate next FIFO. In tiled screen topology, pixel routing may not be required since pixels are directly mapped to a particular SM ASIC. One alternative embodiment utilizes a combination between the standard topology and the tiled screen topology. Standard topology would be used for unordered mode, and tiled screen topology would be used for ordered mode. In this case, the pixel routing would be disabled upon entering ordered mode.

The SM's Pixel Write Unit 815 receives samples from the RPs as input. The Pixel Write Unit 815 is responsible for outputting samples to the memory subsystem (and ultimately the memory 805). Two possible sample generation modes are "super-sampling" and "multi-sampling." When "super-sampling," the RP evaluates color, texture, and z value for each sample and passes the sample to the SM 800. The SM 800 passes the data directly into the memory 805. This allows "texture per sample" and "color per sample" operation.

When multi-sampling, color (including texture) is evaluated for one sample per pixel, and the SM 800 expands the parameter set for the one sample into multiple samples per pixel using a sample mask and z slopes (partial derivatives of z with respect to sub-pixel x and y). For each pixel, a RP will send a parameter set for one sample including color, z value, z slopes, and a sample mask. Within the SM, the samples will be expanded and individually written to the memory 805. Sample expansion may be accomplished by replicating color values across multiple samples and interpolating z for each of the locations of the multiple samples from a z value for the one sample and slopes for the rate of change of z within the pixel. A plurality of Z interpolators may be utilized and have knowledge of the jitter tables that define each sample's location (sub-pixel x and y). A sample mask indicates which of the potential sub-pixel locations are enabled, and those samples may be expanded. Alternatively, the plurality of interpolators may be shared among more than one pixel to get better utilization on triangle edges where less samples will be filled. The samples are tested against the Z cache and they may be sent to a blend unit. The samples are then sent to the memory 805. Data reduction or compression techniques may be used to reduce the amount of data per pixel. For example, since Z-Slopes are constant across a triangle, they may only be sent once per triangle.

There are a number of opportunities for caching in this architecture. A hierarchical Z cache may be used, perhaps storing nearest and farthest Z for blocks of pixels. Similarly, some information may be stored about the depths of the samples within a pixel, to reduce the number of reads of the Z buffer. A pixel (sample) buffer, may also be used. The pixel buffer may hold on to the last several pixels accessed. Across a surface, a pixel that is not completely covered by one triangle (i.e. has an edge going through it), will likely be accessed soon by another triangle that will cover some of the remaining samples.

Blend units may be used to perform sorting for arbitrary order transparency. These blend units may be programmable (or partially programmable).

Samples can be read from the memory 805 in several ways:

1. Single Sample Readback: a single sample per pixel may be read and returned or a specified number of multiple reads may be performed.
2. Full Pixel Readback: a set of samples corresponding to a pixel may be read back and returned.
3. Box Filtered Pixel Readback: a set of samples corresponding to a pixel may be read out of the sample buffer and the samples averaged using a box filter. The filtered result is returned.
4. Convolved Filtered Pixel Readback: some of the convolution hardware may be replicated for readback. Based on a table of filter weights, the SM 800 filters the samples it owns. The partial sums are returned, which include a partial sum of weighted sample values and a partial sum of the weights.

Convolve Subsystem

The Convolve Subsystem requests samples from the memory 805 and filters the samples into pixels. However, unlike prior systems, convolution (or filtering) is distributed. Each SM 800 calculates partial sums for the samples from its memory 805, adds the partial sums to the accumulated partial sums from the previous SM, and passes the new accumulated partial sums to the next SM. The last SM in the chain of SMs sends the accumulated sums to the Video subsystem for calculation of pixel values from the accumulated partial sums (see FIG. 3 and FIG. 6).

Figure 7:
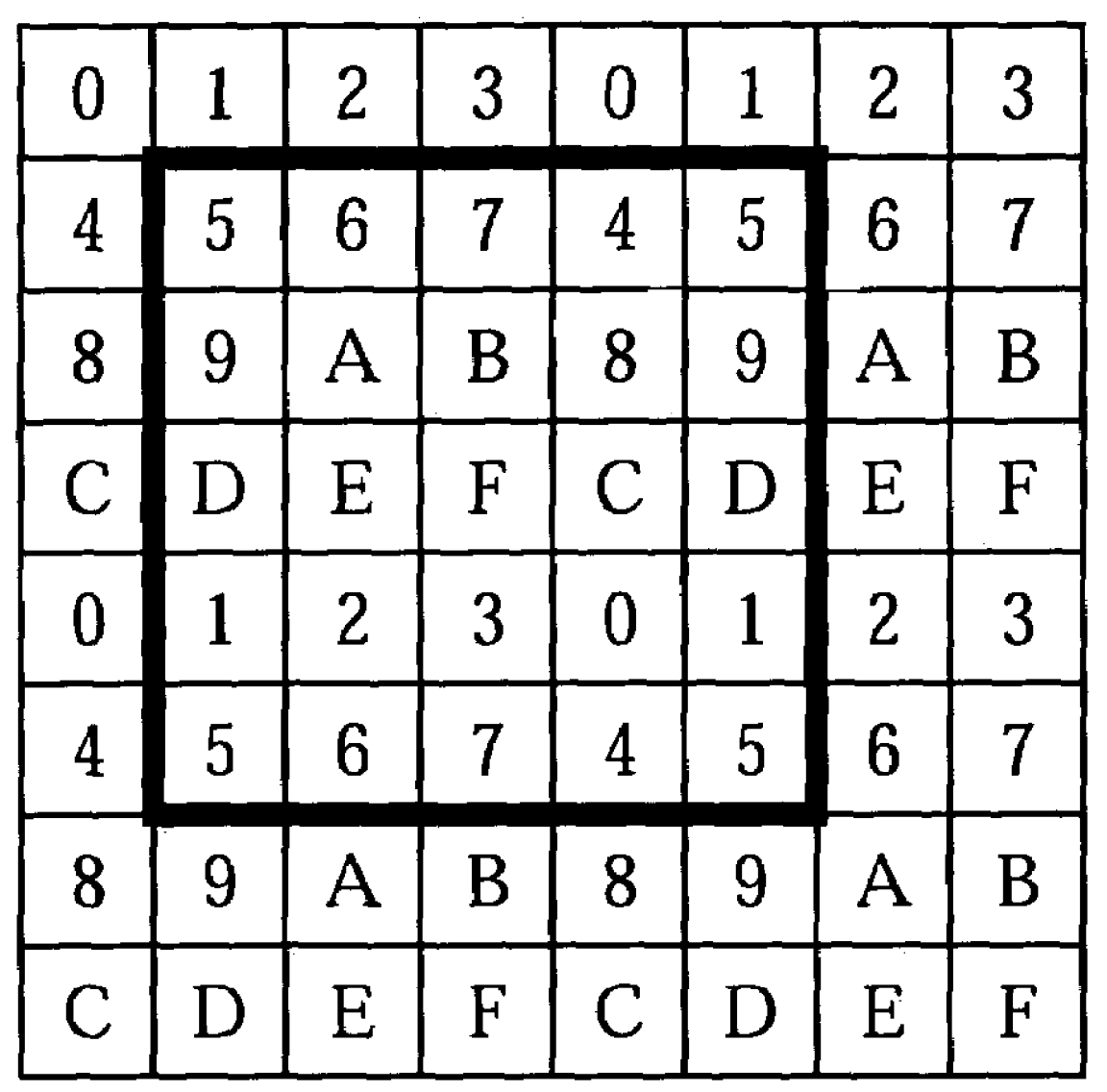

The 5×5 pixel neighborhood containing the convolution kernel has significant reuse of samples. Rather than re-fetching the data from memory, each time, the Sample Cache is responsible for holding the samples that are reused for convolution. FIG. 7 shows how a 5×5 filter kernel maps onto the 4×4 bin interleaves of the SMs. Each box in FIG. 7 represents a pixel bin. These bins contain some number of samples corresponding to a sample density selected or programmed. For standard video formats (not resized), the kernel moves across the sample space at the rate of one bin per pixel clock. However, due to the interleaving, a new pixel bin is required by each SM only once every four pixel clocks, and the kernel includes no more than two bins from any interleave. Similarly, in the Y direction, the kernel moves through the sample space at one line per line time. A new line is required only once every four line times, and the kernel includes no more than two lines from any interleave.

The 5×5 kernel may include from 1 to 4 bins from any SM interleave. At most, two bins from any one line will be included at one time. Given two line buffers, each line buffer provides access to two bins at once. Each line buffer need not provide two read ports. In fact, since the data is accessed in raster order, significantly less bandwidth is needed. Once accessed from the line buffer, a sample is used five times before being retired, and a new sample is needed every four convolve clocks. If register storage for two pixel bins is provided, access to the memory may be needed only once every four pixelclocks to fetch the next bin. This allows a denser memory usage, reducing the area of the line buffers. It should be noted that only one of 16 SMs will use this peak rate at a time. But once the hardware supports this rate, the filtering kernel could be expanded to 8×8 (as shown in FIGS. 1 through 10) without increasing the requirements for the filter cache.

A table of filter weights may be stored in a cache, such as Sample Weight Table 835. For any given pixel being filtered, up to four bins may be accessed (1, 2, and 4 are possible). If, rather than "just in time" lookups, a small FIFO is provided to store the lookups, the load may be averaged out. Four lookups are required, only once every four pixels; the remaining three pixels may require only three lookups. The bandwidth may be further reduced by averaging over the full line-time.

Video Subsystem

In some embodiments each SM 800 may support two video streams. Each SM has its own video subsystem, though most may be unused, and only one used for each video stream. With the exception of the sample cache, convolution resources may be shared among multiple video streams. This may even include the partial results bus. Supporting two video streams can be accomplished by either dedicating two partial results buses, or by sharing the partial results bus. In either case, the last SM in each chain may be designated to output the video pixels. In one embodiment, the system supports one video stream for every SM 800, by sharing the partial results bus (or buses).

The normalization section is responsible for computing the final filtered pixel values from the weighted sums of samples. The output of the convolution subsystem is four weighted sums of samples (R,G,B,A) and a sum of the weights. Normalization may include a division (or a reciprocal and multiply operation). Edge blend may be performed by a table lookup. Once pixels are processed they may be pushed into a Local Video Fifo. Pixels may be read out of this FIFO at the video pixel clock rate. Logic below this FIFO may run on the video pixel clock.

Please refer to the following patent applications for more information on how to make and use a scalable series of video routers to incrementally accumulate a set of one or more video streams:

(a) U.S. patent application Ser. No. 09/894,617, filed on Jun. 27, 2001, entitled "Flexible Video Architecture for Generating Video Streams", invented by Deering and Naegle;

(b) U.S. patent application Ser. No. 10/195,857, filed on Jul. 15, 2002, entitled "Initializing a Series of Video Routers that Employ Source-Synchronous Signaling", invented by Nathaniel David Naegle.

These applications are hereby incorporated by reference in their entireties.

Convolution Areas

A convolution area is the region in sample space assigned to a chain of SMs. In the standard configuration, 16 SMs cover a single convolution area. The system may support two video streams for each convolution area. If more video streams are required, the capability of the system may be increased by dividing the sample space into multiple convolution areas. Each SM may be dedicated to a single convolution area. If the 2×2 interleaving is maintained, each RP retains access to the entire sample buffer. Convolution areas may have the following properties:

1. Two video streams may be supported from each convolution area.
2. Any RP may render to any convolution area.
3. Rendering to a particular area approaches the full geometry rate of the system, but only 1/Nth the fill rate (for N areas).
4. When supporting more than one convolution area, each SM is responsible for more bins within the 5×5 kernel. Therefore, the resource requirements for convolution will be higher, and for a fixed number of SMs the maximum video resolution will be decreased.

Given a system with 4 RPs and 16 SMs, in which the 16 SMs are divided into four convolution areas, the system might be reconfigured as four independent systems. Each of these systems may have a geometry rate approaching 100 M triangles/sec, and a fill rate approaching 8 G samples/sec, and support 2 streams of video. This may be a way of using an SM-based system as a graphics server.

Alternate Topology

Since each RP may be responsible for particular portions of the screen, sample manager topology may be simplified by interleaving the SMs in the same fashion. Each RP may be attached to a group of four SMs. 16 SMs may be numbered such that the lower two bits indicate the interleave within the group, and the upper two bits indicate the group number. FIG. 8 shows the interleaving of the SMs.

This topology allows a reduction in the bandwidth requirement for the partial results bus. This can be done because most of the pixels on the screen will only require samples from a single group. Therefore, partial results will flow through fewer SMs, reducing the overall bandwidth requirement. As the 5×5 kernel moves across the screen, its center will fall within exactly one group (e.g., a 16×16 block). Partial results will flow through and towards that group. The last SM in the target group's chain normalizes the sum and places the filtered pixel in its video FIFO.

Figure 9:
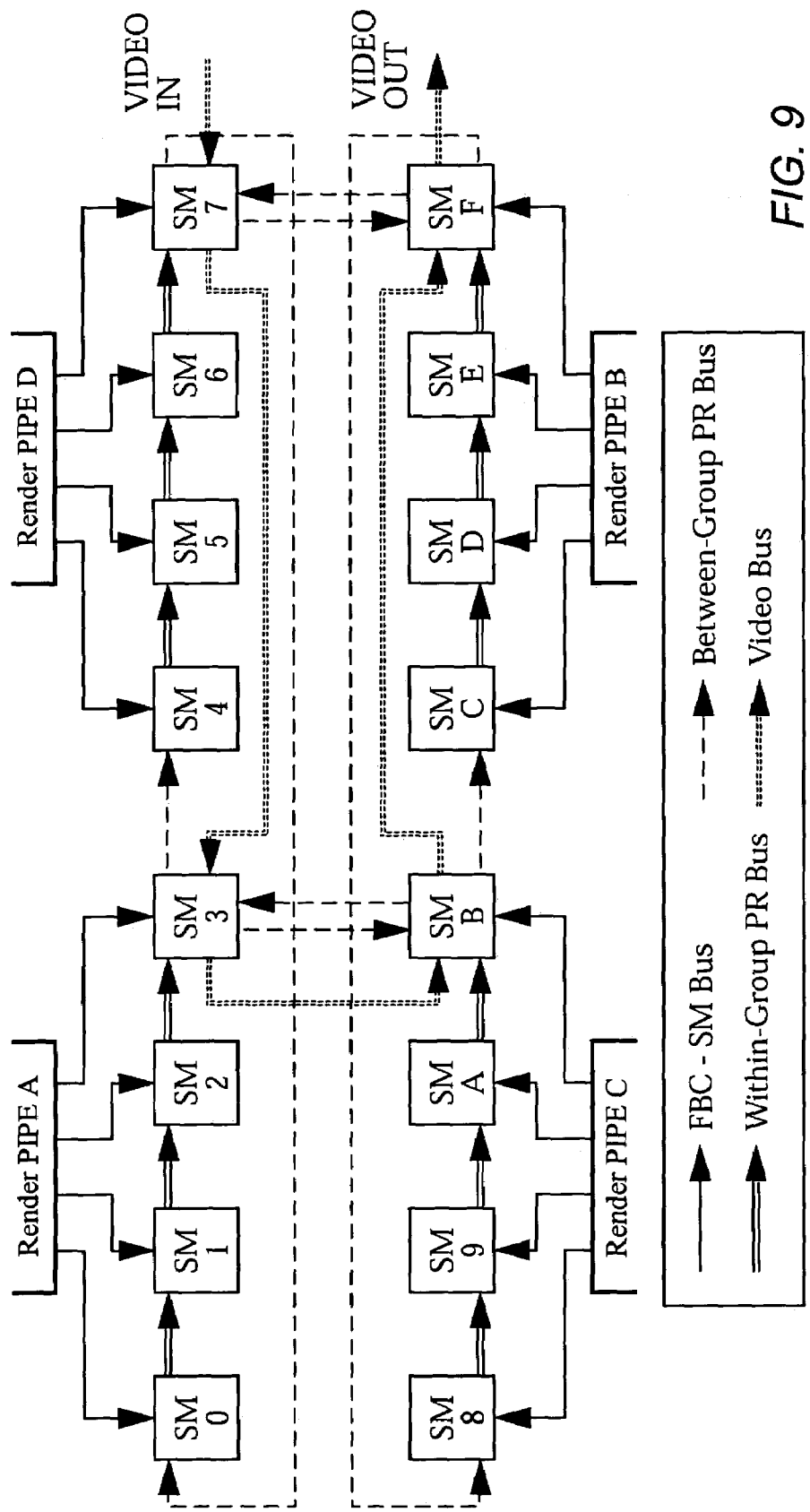
FIG. 9 illustrates a second interconnection topology for a system of 16 Sample Manager ASICs.

Because of the coarser interleaving of blocks of sample bins (e.g., 16×16 arrays) most of the samples for a pixel will exist within the same group as the destination video FIFO. As such, the partial results need only flow through the chips for that block. Since each block is responsible for ¼ of every line, the net result is that the partial results bus may need about ¼ of the bandwidth of the original system. This bus is the Within-Group Partial Results Bus (or WG bus). For the pixels around the edges of the blocks, additional groups may be used to contribute partial results to the final pixel. Therefore, a bus for communicating partial results between groups may be provided. These buses are known as the Between-Groups Partial Results Buses (or BG buses). The last SM in each group contains the video FIFO for that group. The video bus flows through each of these "last" SMs to complete the video. FIG. 9 shows the connection of the various buses. Additional boards may be connected in the video chain.

Each SM knows the number of its group, and the SMs in a group act in a consistent manner. For any pixel on the screen (i.e. any convolution kernel center), the SMs in a group will classify it in one of three ways:

1. Local Pixel—This pixel lies within the group's region. The final result will end up in the group's video FIFO.
2. Adjacent Pixel—This pixel lies outside of the group's region, but is within the convolution kernel radius of the group's region's border. A partial result is generated and passed on to the group for which this pixel is a local pixel.
3. Idle Pixel—This pixel is outside of the group's region and further than a convolution kernel radius from the group's region's border.

Figure 10:
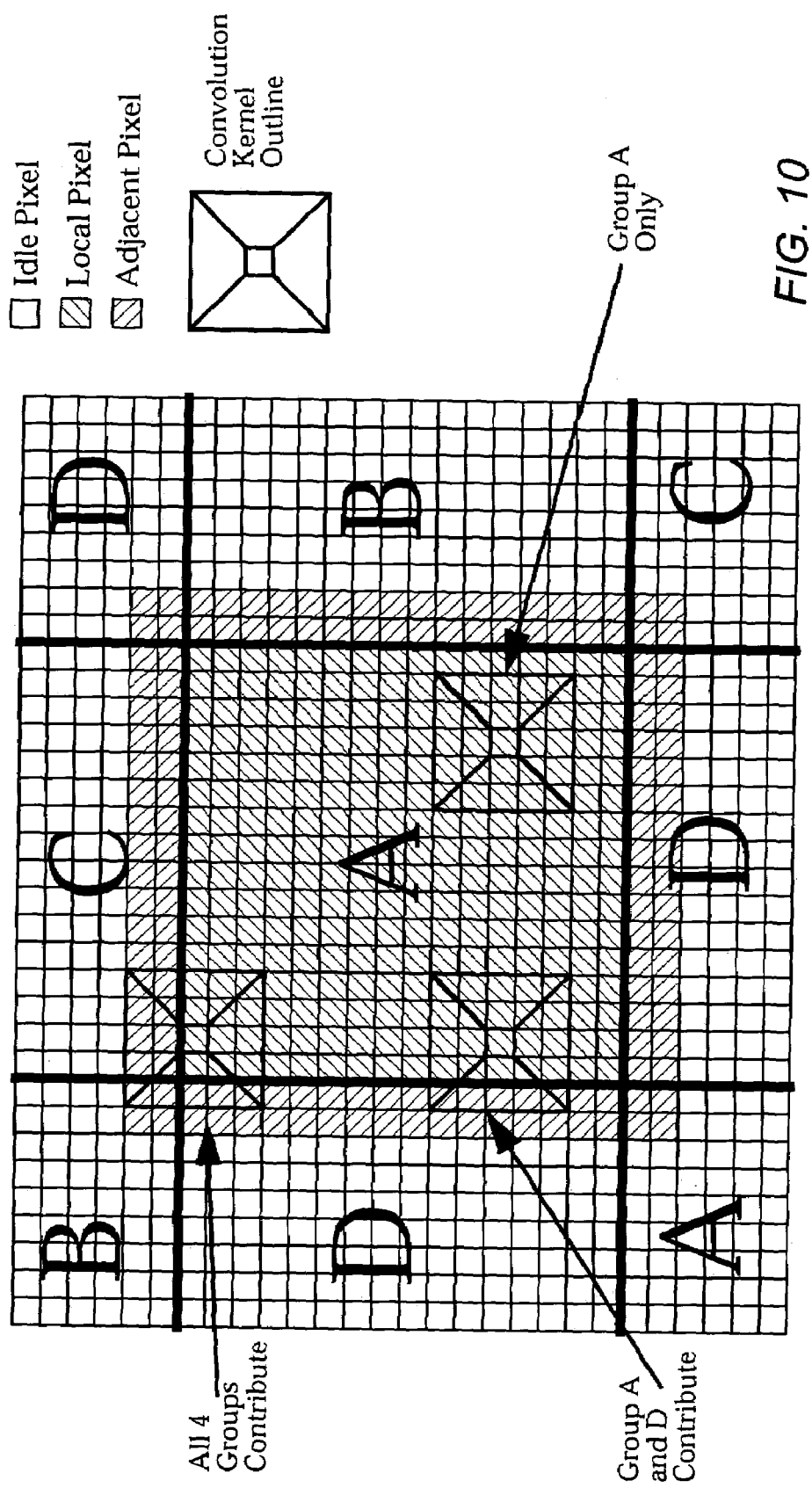
FIG. 10 illustrates three possible filter kernel types for a system of four groups of four Sample Managers.

FIG. 10 shows the classification of pixels for Group A for a region of the screen, as well as three example convolution kernel outlines. These examples show the possibility of one, two, or four groups contributing to a video pixel. When multiple groups contribute to the final pixel result, it is possible for either two or four groups to work together. The BG buses are used to allow partial results to flow between groups. The buses are set up so that partial convolution results data does not have to flow between groups which do not contribute to the final result. Groups may calculate partial results in series (the output of one group flows into the beginning of the next group's chain) or parallel (both groups calculate their partial results, and the ends of the chains are joined). When the four groups combine for a single result, the operation is completed as a parallel combination of two series combinations.

To support a single video stream, each SM supports a ring connection (one input and one output) for video. All SMs may have this ring bus. However, only every fourth SM may be connected to the video ring. In addition, each SM may have two ring connections (i.e two inputs and two outputs) for partial results. One of these rings (a serial ring) supports the Within-Group Partial Results Bus. In addition, the same ring is used to carry a portion of the Between-Group Partial Results buses. The second ring (a parallel ring) may be used for Between-Group connectivity. These connections are shown in FIG. 9.

Additional video streams (up to a total of 4) may be supported by adding additional serial rings. The second channel would be supported by a second serial ring. The ring may run in the opposite direction (though any ordering works as long as a different SM is the last in the chain for any video channel). Whichever SMs are last in their respective group's chain, will be connected via the video bus and the parallel ring. Since these rings (video and parallel) already exist but are unused, it suffices to add the additional serial ring to make use of them.

In one embodiment, the SM may support very high speed monitors and projectors. The SM may support a mode by which the two channels can be set up to generate even and odd pixels, respectively. The two streams will be genlocked together and the resulting pixels will be output per normal operation.

In other embodiments, filter logic may be placed in the RPs. Each SM may send its partial results for the particular pixel up to a RP. The RP may then do the final normalization. In this case, 144 of 256 pixels would require no partial results. Of the remaining 112 pixels, 96 require partials from one neighbor and 16 require partials from all four groups.

Distributed Convolution (Chain of Sample Managers)

Figure 11:
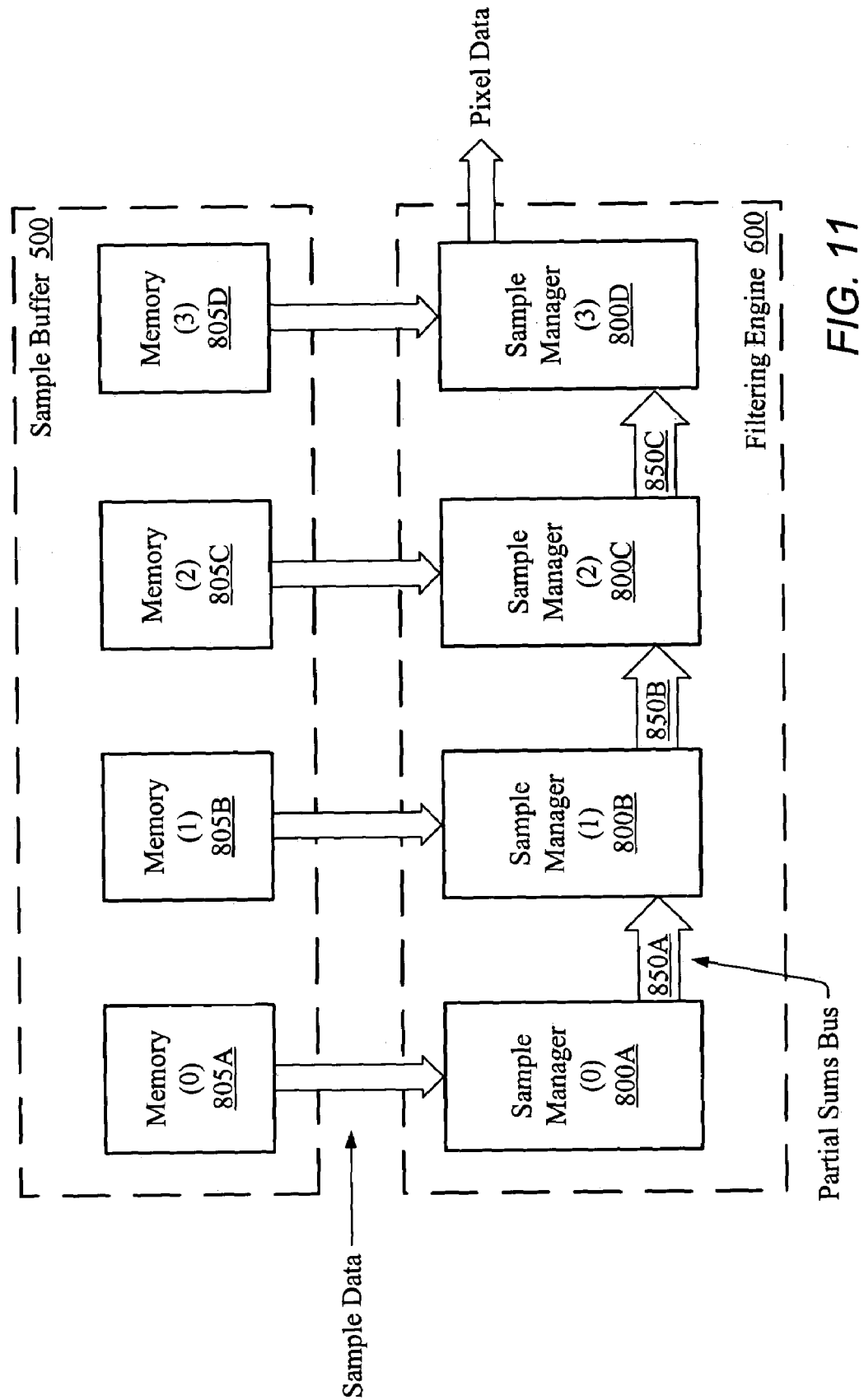
FIG. 11 provides a block diagram of one embodiment of a sample buffer 500 and filtering engine 600.

FIG. 11 illustrates one set of embodiments of a system for distributing the convolution process. Rather than having multiple convolution chips working in parallel with each chip working on a different portion of the screen, a new design utilizes a plurality of sample managers working in series. Each sample manager 800X in a chain of sample managers 800A-D performs part of the convolution process (also referred to as filtering) and sends a partial result on to the next sample manager (800X refers to any one of the sample managers 800A-D). The final sample manager in the chain completes the convolution, calculates pixel values, and adds the pixel values to a pixel buffer. Distributing the convolution process in this manner may enable a much simpler board design. Instead of a cross-bar providing communication between all of the memory chips and all of the convolution chips, this new design enables a dedicated, direct connection between a memory 805X (which may include a set of one or more memory chips) and a corresponding sample manager chip. FIG. 11 shows a chain of 4 sample managers. However, in other embodiments, a system for distributing the convolution process may include a different number of sample managers and memories, such as the 16 sample managers utilized in FIGS. 6 and 9.

Each sample manager 800X (also referred to as a filter unit) determines if any of the samples in its dedicated memory fall within a convolution kernel corresponding to a pixel. The sample manager 800X calculates a weight for each sample, a sum of weighted samples, and a sum of weights for any samples stored in its dedicated memory 805X and that are within the convolution kernel. The sums are referred to as partial results or partial sums. Since the partial sums are additive, the sample manager 800X adds the partial sums it has generated to any prior accumulated partial sums it received from the prior sample manager in the chain and sends the new accumulated partial sums to the next sample manager in the chain. After the final sample manager in the chain adds the partial sums it has generated to the accumulated partial sums it received, the final sum of weighted samples is divided by the sum of the weights. This produces a weighted average for all the samples in the convolution kernel, which is the final filtered pixel value.

The weight for a sample may be generated as a function of the distance from the location of the sample to the pixel location (the center of the convolution kernel). The weight function may be user definable and may be generated from a lookup table stored in a cache or memory.

The samples to be considered are samples that are within a convolution kernel corresponding to a pixel (typically bounded by a 5 by 5 array of pixel boxes in sample space). Those samples within the kernel that lie outside the defined filter boundary, however, may be assigned a weight of zero.

In one set of embodiments, a system for distributed convolution (or filtering) of samples includes: a sample manager 800X for calculating partial sums for its portion of the samples within a convolution kernel, where the partial sums comprise 1) a sum of weights determined for each sample location of the samples in the portion of samples and 2) a sum of weighted sample values for the portion of samples, and where the sample manager 800X adds the partial sums to any previously accumulated partial sums and outputs new accumulated partial sums; a partial sums bus (connecting the sample manager 800X to a prior sample manager in a chain of sample managers) for passing any previously accumulated partial sums to sample manager 800X; and another partial sums bus (connecting sample manager 800X to the next sample manager in the chain) for passing the new accumulated partial sums to the next sample manager. The plurality of sample managers form a chain, where each sample manager in the chain may be connected to the next sample manager by a partial sums bus, and where a last member of the chain is operable to calculate pixel values from the final accumulated partial sums.

Sample values include RGB color values and alpha (transparency), and partial sums include partial sums for each of these parameter values.

A sample manager's portion of samples includes samples that are within the convolution kernel, but also reside in a sub-set of screen space assigned to the sample manager. The sub-sets for all sample managers may be finely interleaved across screen space. In some embodiments with 16 sample managers, each sample manager addresses one sample bin in a 4 by 4 array of sample bins and a corresponding sample bin in each repetition of the interleaved 4 be 4 array across sample space as illustrated in FIG. 5.

In some embodiments, the last sample manager in a chain may be operable to calculate parameter values for a pixel from the final accumulated sums corresponding to each sample parameter value, where the pixel values equal an accumulated sum of weighted parameter values for each sample within the convolution kernel divided by an accumulated sum of the weights determined for the location of each sample within the convolution kernel. In other embodiments, several sample managers in the chain may be enabled to calculate pixel values. In still other embodiments, many sample managers may be enabled to calculate pixel values. The section of a sample manager that is operable to calculate pixel values may be referred to as a pixel calculation unit.

A distributed convolution system may also include a plurality of memories for storing sample values, where each memory is dedicated to a unique member of the sample manager chain, each memory stores sample data for samples in the unique sub-set of screen space assigned to the corresponding sample manager, and where each sample manager may be operable to read a set of samples from it's dedicated memory (a memory may be a plurality of memory chips or memory units); a plurality of rendering units that generate samples, where each sample generated is stored in one of the memories; and one or more analog to digital video units for converting the pixel values to video output signals.

Distributed Convolution (Groups of Sample Managers)

Each sample manager may contribute to most pixel calculations if the sample buffer is finely interleaved. However, if the sample buffer is coarsely interleaved, some sample managers may be idle and waste bandwidth passing partial results without adding additional weighted samples to the partial results. For example, a particular sample manager (or group of sample managers) may be responsible for a particular section of the screen that is large with respect to the convolution kernel. When processing pixels within the particular section, other sample managers (or groups of sample managers) may be idle.

FIG. 9 illustrates one set of embodiments of an alternate architecture of sample managers interconnected in a series/parallel structure that may alleviate these processing issues. In these embodiments, the set of sample managers is divided into groups. Within a group, the sample managers operate in series, whereas the groups may operate in parallel. Sample space is tiled in a repeating pattern of an array of sections of sample space. The samples within each section are stored in the memories attached to one group of sample managers, and each section is large compared to the convolution kernel. The majority of pixel locations that reside in the interior of a section will be processed by the group of sample managers assigned to the section. Pixel locations that lie near the edge of a section may be processed by two or more groups of sample managers as illustrated in FIG. 10. This system design may result in a reduction in the amount of hardware and interconnect bandwidth utilized to implement distributed convolution.

In one set of embodiments, a system with a series/parallel structure for distributed convolution (or filtering) of samples for a pixel may include:

N memories 805 (k), wherein each memory (k) stores sample data for samples located within a specified sub-set of screen space, wherein (k) is an integer ranging from 0 to N−1, N sample managers 800 (k) (also referred to as filter units) arranged in M groups, wherein each sample manager (k) is coupled to a dedicated one of the memories (k), a first set of partial sums buses connecting each sample manager 800 k within a group to the next sample manager in the group, a second set of partial sums buses connecting one group of sample managers to another group of sample managers, where a sample manager (k) within a group is operable to:

receive accumulated partial sums from a prior sample manager within the group or from another group of sample managers, read a set of samples from the corresponding memory (k), wherein the set of samples are within the specified sub-set of screen space assigned to the memory (k), and wherein the set of samples are located within a convolution kernel defined for the pixel, calculate partial sums for the set of samples, add the partial sums to the accumulated partial sums, and output the accumulated partial sums to the next sample manager within the group of sample managers, or to another group of sample managers, and wherein a last sample manager within a group may operate on the final accumulated sums to compute pixel values, after all samples within the convolution kernel have been processed.

In some embodiments, the last sample manager within a group may output the final accumulated sums to an external unit for pixel calculation.

In a particular set of embodiments, where N=16, M=4, and the 16 sub-sets of screen space are interleaved, each sample manager within a group may address one sample bin in a 2 by 2 array of sample bins that is repeated across a 16 by 16 array of sample bins. Four permutations of each of the four different 16 by 16 arrays (one for each group) may be combined to form a 64 by 64 array of sample bins that is repeated across screen space. FIG. 8 illustrates this particular interleave of sample space.

Method for Distributed Convolution

Figure 12:
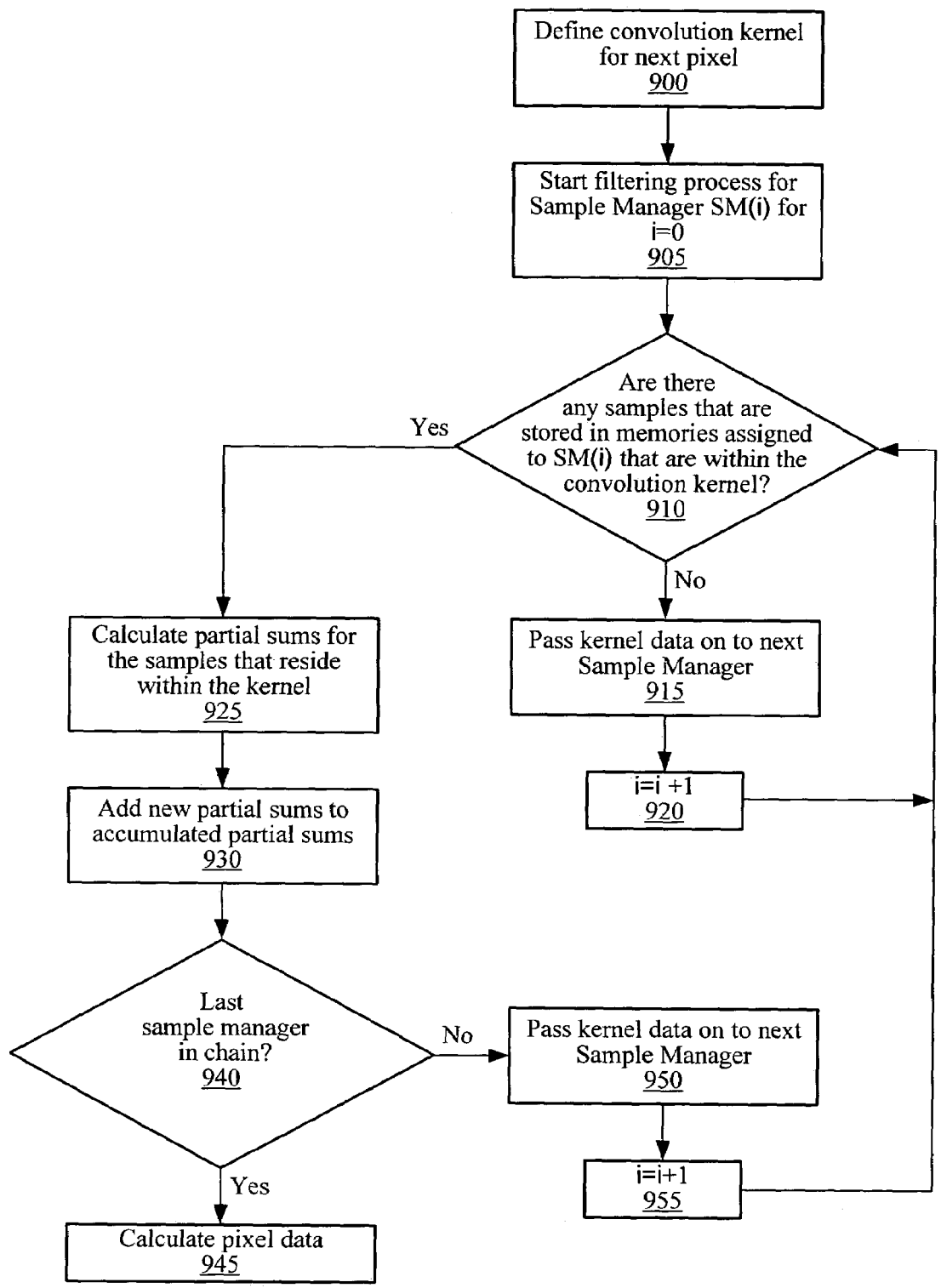
FIG. 12 provides a flow chart for a method of distributed convolution.

FIG. 12 illustrates a set of embodiments of a method for distributed convolution (or filtering) of samples that may include one or more of the operations of: defining convolution kernel parameters for a next pixel (step 900), initiating a convolution process with a first sample manager in a chain (also referred to as a sequence) (step 905), identifying a first portion of samples that are within the convolution kernel and are assigned to the first sample manager (step 910), calculating first partial sums for the first portion of samples (step 925), and sending (also referred to as passing) the first partial sums to a sequence of additional sample managers (steps 940 and 950).

Each of the additional sample managers in the chain performs one or more of the operations of: receiving accumulated partial sums from the previous sample manager in the chain (step 950), calculating new partial sums for a corresponding portion of samples located within the convolution kernel (step 925), adding the new partial sums to the accumulated partial sums (step 930), and sending the new accumulated sums to the next sample manager in the chain of sample managers (step 950).

A last sample manager in the chain of sample managers may perform one or more of the operations of: receiving accumulated partial sums from the previous sample manager in the chain (step 950), calculating new partial sums for a corresponding portion of samples (step 925), adding the new partial sums to the accumulated sums to complete final sums (step 930), calculating pixel values from the final sums (step 945), and outputting the pixel values.

A convolution kernel defined for a pixel is a region in screen space contained within a defined boundary and centered on the pixel location. Sample values include parameter values of color and transparency. Partial sums for each parameter value include 1) a sum of weighted sample values (sum of the products of each sample value and a determined weight for the location of each sample) and 2) a sum of the weights determined for the location of each sample. The weight for a location of a sample may be determined by a weight function. The weight function may have any of a variety of functional forms, including but not limited to a box filter, pyramid filter, circular filter, cone filter, Gaussian filter, and sinc filter. Pixel values equal a sum of weighted sample values (for samples within the convolution kernel) times a reciprocal of a sum of the weights determined for the locations of samples.

Each portion (k) of samples (also referred to as a specified set of samples) is within a specified screen space region (also referred to as a specified sub-set of screen space) assigned to the corresponding sample manager (k). The portion (k) of samples are read from a memory (k) dedicated to the sample manager (k). The specified screen space regions may be finely interleaved across screen space. For a system of 16 sample managers, each sample manager (k) may address one sample bin in each 4 by 4 array of sample bins repeated across screen space.

In another set of embodiments, the sample managers may be sub-divided into a plurality of groups of sample managers, each group may be a chain of sample managers, and a plurality of partial sums buses interconnect the groups. Each sample manager (k) may be assigned samples in a specified sub-set of screen space. The sub-sets may be interleaved across screen space. For a system of 4 groups of 4 sample managers in a chain, each sample manager within a group addresses a sample bin in a 2 by 2 array of sample bins and the corresponding sample bins in a 16 by 16 array that comprises repetitions of the 2 by 2 array. Four repetitions of each of the four different 16 by 16 arrays (one for each group) may be combined to form a 64 by 64 array of sample bins that is repeated across screen space.

In these embodiments, a last sample manager in each group may calculate pixel values from the final accumulated partial sums corresponding to a pixel.

Numerous variations and modifications will become apparent to those skilled in the art once the above disclosure is fully appreciated. It is intended that the following claims be interpreted to embrace all such variations and modifications.

What is claimed is:

1. A system for distributed filtering of samples within a convolution kernel to calculate values for a corresponding pixel comprising:

a series of means for calculating partial sums, wherein each member of the series calculates partial sums for a corresponding portion of the samples within the convolution kernel for the pixel, wherein the partial sums calculated by each member of the series comprise 1) a sum of weights determined for the sample locations in the corresponding portion of samples and 2) a sum of weighted sample values for the corresponding portion of samples, wherein each member of the series adds the calculated partial sums to corresponding accumulated partial sums and outputs the new accumulated partial sums, and wherein a last member of the series calculates pixel values from the final accumulated partial sums; and means for passing accumulated partial sums from one member of the series to the next;

a plurality of means for storing sample values, wherein each means for storing sample values is dedicated to a different member of the series; and a plurality of means for rendering samples, wherein each sample generated is stored in one of the means for storing sample values.

2. The system of claim 1, wherein a sample comprises parameter values for color and transparency, and wherein partial sums comprise partial sums for each of the parameter values.

3. The system of claim 1, wherein each means for calculating partial sums is assigned one or more sample bins from an interleaved array of sample bins and the interleaved array of sample bins is repeated across screen space.

4. The system of claim 1, further comprising a means for converting the pixel values to video output signals.

5. A system for distributed filtering of samples comprising:

a series of N sample managers (k), wherein k is an integer with range 0 to N−1, and wherein N is an integer greater than 1;

a partial sums bus connecting each sample manager (k) in the series of sample managers to the next sample manager (k+1);

wherein sample manager (k) is operable to:
   receive accumulated partial sums from a prior sample manager (k−1), if k is greater than zero, wherein each sample comprises values for a plurality of parameters, and wherein partial sums comprise partial sums for each sample parameter value,
   calculate partial sums for a set of samples, wherein the set of samples are within a sub-set of screen space assigned to sample manager (k), and wherein the set of samples are located within a convolution kernel defined for a pixel,
   add the partial sums to the accumulated partial sums, and
   output the accumulated partial sums to sample manager (k+1), if k is less than N−1; and
wherein a designated sample manager is operable to calculate pixel parameter values from the final accumulated partial sums; and
wherein each pixel parameter value equals a corresponding final accumulated sum of weighted sample parameter values for each sample within the convolution kernel divided by an accumulated sum of weights for locations of each sample within the convolution kernel.

6. The system of claim 5, further comprising a memory (k) dedicated to sample manager (k), wherein memory (k) stores sample data for samples in the sub-set of screen space assigned to the sample manager (k).

7. The system of claim 6, wherein each memory (k) comprises a plurality of memory units.

8. The system of claim 6, wherein sample manager (k) is operable to read the set of samples from the memory (k).

9. A method for distributed filtering of samples comprising:
   calculating first partial sums in a first filter unit for a first set of samples, wherein partial sums comprise a sum of weighted sample values for the set of samples and a sum of weights determined for the locations of each sample, wherein a weighted sample value is a product of the sample value and the determined weight for the location of the sample, wherein sample values comprise color values and transparency, wherein the first set of samples is a portion of the samples located within a convolution kernel defined for a pixel location, and wherein the first set of samples are within a region of screen space assigned to the first filter unit; and
   sending the first partial sums to a sequence of additional filter units, wherein each of the additional filter units:
      receives accumulated partial sums from the previous filter unit,
      calculates new partial sums for a corresponding set of samples located within the convolution kernel and within a corresponding region of screen space assigned to the filter unit,
      adds the new partial sums to the accumulated partial sums, and
      if not a last filter unit in the sequence of filter units, sends the new accumulated partial sums to the next filter unit in the sequence of filter units.

10. A method for distributed filtering of samples comprising:
   calculating first partial sums in a first filter unit for a first set of samples, wherein the first set of samples is a portion of the samples located within a convolution kernel defined for a pixel location, and wherein the first set of samples are within a region of screen space assigned to the first filter unit; and
   sending the first partial sums to a sequence of additional filter units, wherein each of the additional filter units:
      receives accumulated partial sums from the previous filter unit,
      calculates new partial sums for a corresponding set of samples located within the convolution kernel and within a corresponding region of screen space assigned to the filter unit,
      adds the new partial sums to the accumulated partial sums, and
      if not a last filter unit in the sequence of filter units, sends the new accumulated partial sums to the next filter unit in the sequence of filter units, and
      if the last filter unit in the sequence of filter units, calculates pixel values from the final sums, by multiplying a final sum of weighted sample values times a reciprocal of a final sum of the weights for each parameter value comprising one or more of color values and transparency.

11. The system of claim 1, wherein the last member of the series calculates pixel values from the final accumulated partial sums by dividing a final accumulated sum of weighted sample values by a final accumulated sum of weights.

12. The system of claim 1, wherein for each member of the series the corresponding portion of samples resides in a sub-set of screen space and the sub-set is interleaved across screen space.

13. The system of claim 12, wherein the members of the series comprise 16 means for calculating partial sums, and wherein each means for calculating partial sums addresses one sample bin in a 4 by 4 array of sample bins and a corresponding sample bin in each repetition of the 4 by 4 array to span screen space.

14. The system of claim 1, wherein the members of the series are arranged in a plurality of groups, and wherein each group's means for calculating partial sums are connected in series.

15. The system of claim 14, wherein for each means for calculating partial sums the corresponding portion of samples resides in a corresponding sub-set of screen space and the sub-sets are interleaved across screen space, wherein for a system of 4 groups of 4 means for calculating partial sums in a series, each means for calculating partial sums within a group addresses one sample bin in a 2 by 2 array of sample bins that is repeated across a 16 by 16 array of sample bins, and wherein four permutations of each of the four different 16 by 16 arrays (one for each group) are combined to form a 64 by 64 array of sample bins that is repeated across screen space.

16. The system of claim 14, wherein a designated one of the means for calculating partial sums in each group calculates pixel values from the final accumulated partial sums.

17. The method of claim 9, wherein the convolution kernel defined for the pixel is a region in screen space within a defined boundary and centered on the pixel location in screen space.

18. The method of claim 9, wherein a weight for the location of each sample value is determined by a weight function selected from a set of functions comprising a box filter, pyramid filter, circular filter, cone filter, Gaussian filter, and sinc filter.

19. The method of claim 9, wherein the last filter unit of the sequence of filter units calculates pixel values from the final accumulated sums.

20. The method of claim 9, wherein each set of samples is within a screen space region assigned to the corresponding filter unit, and wherein each set of samples are read from a memory dedicated to the corresponding filter unit.

21. The method of claim 9, wherein for each filter unit, the corresponding set of samples resides in a sub-set of screen space and the sub-sets are interleaved across screen space.

22. The method of claim 21, wherein for a system of 16 filter units, each filter unit addresses one sample bin in a 4 by 4 array of sample bins that is repeated across screen space.

23. The method of claim 9, wherein the filter units are sub-divided into a plurality of groups of filter units and a plurality of partial sums buses interconnect the groups, and wherein each group is a series of filter units.

24. The method of claim 23, wherein a last filter unit in each group calculates values for a pixel from the final accumulated partial sums corresponding to the pixel.

25. The method of claim 23, wherein for each filter unit the corresponding set of samples resides in a sub-set of screen space and the sub-sets are interleaved across screen space.

26. The method of claim 25, wherein for a system of 4 groups of 4 filter units in a series, each filter unit within a group addresses a sample bin in a 2 by 2 array of sample bins that is repeated across a 16 by 16 array, and wherein four permutations of each of the four different 16 by 16 arrays (one for each group) are combined to form a 64 by 64 array of sample bins that is repeated across screen space.

* * * * *